United States Patent [19]

Sauer

[11] Patent Number: 5,703,156
[45] Date of Patent: Dec. 30, 1997

[54] DISPERSIBLE POWDER BINDERS

[75] Inventor: Thomas Sauer, Haltern, Germany

[73] Assignee: Polymer Latex GmbH & Co. KG, Marl, Germany

[21] Appl. No.: 674,634

[22] Filed: Jul. 5, 1996

Related U.S. Application Data

[63] Continuation of Ser. No. 365,107, Dec. 28, 1994, abandoned.

[30] Foreign Application Priority Data

Mar. 9, 1994 [DE] Germany .................. 44 07 841.2

[51] Int. Cl.$^6$ .................. C08K 3/20; C08L 1/28
[52] U.S. Cl. .................. 524/802; 524/803; 524/817; 524/819
[58] Field of Search .................. 524/802, 803, 524/817, 819

[56] References Cited

U.S. PATENT DOCUMENTS

| 4,397,968 | 8/1983 | Eck et al. ............... 523/305 |
| 5,342,897 | 8/1994 | Franzman et al. ............... 525/221 |

FOREIGN PATENT DOCUMENTS

| 0 467 103 | 1/1992 | European Pat. Off. . |
| 0 629 650 | 12/1994 | European Pat. Off. . |

*Primary Examiner*—Melvyn I. Marquis
*Assistant Examiner*—D. Aylward
*Attorney, Agent, or Firm*—Oblon, Spivak, McClelland, Maier & Neustadt, P.C.

[57] ABSTRACT

Dispersible powdered binders prepared from aqueous acrylate dispersions stabilized by protective colloids and water soluble or water dispersible resins. The binders are suitable for the production of powdered dry paint and coating composition mixtures which can be converted into useful form simply by stirring into water.

13 Claims, No Drawings

DISPERSIBLE POWDER BINDERS

This application is a Continuation of application Ser. No. 08/365,107, filed on Dec. 28, 1994, now abandoned.

BACKGROUND OF THE INVENTION

1. Field of the Invention

The present invention relates to redispersible powder binders prepared from aqueous acrylate dispersions stabilized by protective colloids. The binders according to the present invention can be used in the production of powdered dry paints and coating compositions which can be converted into useful form simply by stirring into water.

2. Discussion of the Background

The use of aqueous acrylate dispersions as binders in water-based paints and coating systems has been known for some time. Such paints and coatings are offered in ready-to-use form, dispersed in water. Because of their complex composition, however, problems develop during the storage and transportation of such ready-to-use formulations, including phase separation, thickening and damage caused by the influence of frost and bacteria. The ever-present susceptibility of such paints and coatings to bacterial attack, which exists because of the aqueous dispersion medium, is usually suppressed by the addition of preservatives. Increased criticism is being levelled at these agents, however, in the context of increasing environmental concerns.

Additionally, the storage and handling of such formulations in ready-to-use form results in a large number of used containers. Since the residue-free emptying and final cleaning of these containers is extremely laborious and expensive, their disposal or reuse represents an increasing problem.

Redispersible powders prepared from aqueous polymer dispersions are also known as additives to hydraulically setting compositions. For example, EP-0 062 106 and EP 0 078 449, both incorporated herein by reference, describe powders of this kind based on acrylate dispersions. EP 0 230 220, incorporated herein by reference, describes a powdered coating composition for building materials in which a commercially available dispersion powder based on vinyl esters is employed.

DE-A 40 21 216, incorporated herein by reference, describes dispersion powders as binders for coating materials and polymer plasters, which additionally contain hydraulic binders such as lime and/or cement. Without the addition of such hydraulic binders, these dispersion powders exhibit inadequate properties in paints and coating compositions.

OBJECTS OF THE INVENTION

One object of the present invention is to provide novel redispersible powdered binders and a process for their preparation, said powders being suitable for use in the production of powdered paints and coating compositions which do not contain hydraulic binders. Other objects will become apparent by reference to the following detailed description of the present invention.

DETAILED DESCRIPTION OF THE PREFERRED EMBODIMENTS

The objects of the present invention are achieved by the discovery of redispersible powdered binders obtainable by the spray-drying of I. aqueous acrylate dispersions stabilized by protective colloids, in the presence of from 0.01 to 30% by weight, based on 100% by weight of I, of II. water-soluble or water-dispersible resins comprising
   a) from 50 to 70% by weight of hydrophobic monomers which are completely or substantially completely insoluble in water, and
   b) from 50 to 30% by weight of hydrophilic, water-soluble and salt-forming monomers, in a stream of hot air to give a free-flowing powder which is low in dust.

Dispersions stabilized by protective colloids described in EP-A-538 570, EP-A-538 571 and DE 44 07 842 all incorporated herein by reference.

Based on the total amount of monomers contained therein, the acrylate dispersions (I.) of the present invention preferably comprise from 20 to 100%, including 30, 40, 50, 60, 70, 80 and 90%, and all ranges therebetween, by weight of alkyl (meth)acrylates having 1 to 18 carbon atoms in the alkyl chain. One or a mixture of two or more (meth)acrylates can be used. Preference is given to methyl methacrylate, n-butyl acrylate and/or 2-ethylhexyl acrylate.

In addition to these alkyl (meth)acrylates up to 60% by weight of other olefinically unsaturated monomers or mixtures thereof (except olefinically unsaturated carboxylic acids) may be present in the invention acrylate dispersions (I.). Suitable monomers are aromatic vinyl monomers such as styrene, vinyl esters having 1 to 12 carbon atoms in the acid component, olefinically unsaturated dienes such as butadiene, and/or halogenated, olefinically unsaturated monomers such as vinyl chloride. Styrene is preferably employed as an additional monomer.

Furthermore, monomers containing functional groups, referred to below as comonomers, may also be present in the invention acrylate dispersions in an amount of up to 10% by weight, preferably from 0.1 to 5% by weight, including 0.5, 1, 2, 3 and 4% by weight, and all ranges therebetween, based on the total quantity of the monomers. The comonomers include, in particular, monomers containing hydroxyl groups, such as hydroxyalkyl (meth)acrylates, monomers containing sulpho or sulphonate groups, such as styrene sulphonate, vinyl sulphonate or sulphoalkyl (meth)acrylates, monomers containing methylol and silanol groups, olefinically polyunsaturated monomers (crosslinking monomers) and, in particular, monomers containing amide groups, such as (meth)acrylamide. These comonomers may be employed individually or in mixtures.

The invention acrylate dispersions may also contain up to 10% by weight, preferably from 0.2 to 5% by weight, including 1, 2, 3 and 4% by weight, and all ranges therebetween, of olefinically unsaturated carboxylic acids, based on the total amount of monomers present. Particularly suitable acids in this context are acrylic acid, methacrylic acid, fumaric acid, maleic acid and itaconic acid.

The quantity of olefinically unsaturated carboxylic acid employed, if any, is preferably neutralized partially or completely, before use, with a nonvolatile base. Preferably, from 0.7 to 1.3 molar equivalents of nonvolatile base, most preferably from 0.8 to 1.2 equivalents of base, are added per molar unit of carboxylic acid. Suitable bases include metal hydroxides which are soluble in water in the acidic to neutral range, and also nonvolatile amine compounds, alkali metal hydroxides being suitable and preferred. The most preferred bases are sodium hydroxide and potassium hydroxide.

Naturally occurring and synthetic water-soluble polymers—so-called protective colloids—are employed to stabilize the invention acrylate dispersions. Examples include derivatives of cellulose, such as hydroxyethylcellulose, hydroxypropylcellulose and carboxymethylcellulose, watersoluble and water-swellable starches and dextrins, polyvinyl alcohols, polyethylene glycols, polyvinylpyrrolidone, polyethylene-polypropylene diblock and triblock copolymers, and naturally occurring proteins such as casein. These protective colloids may be employed alone or in combinations of two or more. The content of protective colloid is from 0.01 to 30% by weight, including 1, 5, 10, 15, 20 and 25% by weight and all ranges therebetween, based on the overall weight of monomers in the acrylate dispersion, preferably from 0.05 to 5% including 0.05, 1, 1.5, 2, 2.5, 3, 3.5, 4 and 4.5% by weight and all ranges therebetween.

Besides the protective colloids, additional emulsifiers may also be employed in dispersion (L) if required. Suitable emulsifiers are known anionic and/or nonionic emulsifiers. Preferably, however, the polymer dispersions according to the invention are prepared using none of, or less than 0.1% by weight of such emulsifiers, based on the overall quantity of the monomers in the acrylate dispersion.

The acrylate dispersions of the present invention may be prepared by emulsion polymerization using a water phase as the continuous phase. The temperature during the reaction is preferably from 40° to 90° C., more preferably from 60° to 85° C. The polymeric protective colloids and the emulsifiers optionally employed are preferably added to the initial charge, but may also, in whole or in part, be added as feeds, continuously or in batches.

The monomers making up the acrylate dispersion may be provided in whole or in part as an initial charge or may be metered in, again in whole or in part, in batches or semi-continuously. The semicontinuous feeding-in of monomers is preferred. The comonomers and olefinically unsaturated carboxylic acids may, in whole or in part, be provided as an initial charge or metered in together with the base employed for neutralization. A preferred procedure is one in which the olefinically unsaturated carboxylic acid is placed as the initial charge together with the base employed for the neutralization. This procedure leads in particular to highly stabilized dispersions which have extremely low contents of coagulated material.

Free-radical initiators soluble in water or oil are employed for the polymerization. Suitable initiators are azo initiators, peroxides, hydroperoxides and peroxo-disulphates, in a quantity of from 0.05 to 3% by weight, based on the overall quantity of the monomers employed in the acrylate dispersion. In addition, from 0.05 to 3% by weight of a reducing agent may be employed. Suitable reducing agents include examples are sodium bisulphite, ascorbic acid and sodium formaldehyde sulphoxylate. In a preferred embodiment, from 0.2 to 2% by weight of a peroxide or hydroperoxide are added to the initial charge and from 0.2 to 2% by weight of an aqueous solution of a reducing agent are metered in semi-continuously.

In addition, regulators soluble in oil or in water may be added to regulate the molecular weight of the polymer and the viscosity of the latex. Suitable and preferred oil-soluble regulators are alkanethiols. Suitable water-soluble regulators include thioethanol, thioglycolic acid and triethanolamine. The regulators are added, alone or as a mixture of two or more, in a quantity of from 0.05 to 2% by weight, based on the overall quantity of the monomers employed, to the acrylate dispersion. The regulators can be added to the initial charge or metered in, separately or as a mixture with other material streams.

The aqueous acrylate dispersions of the present invention have a preferred solids content of from 10 to 65% by weight including 20, 30, 40, 50 and 55% by weight and all ranges therebetween, and preferably from 40 to 60% by weight. At the end of polymerization, the dispersions have a high final conversion and a very low content of unreacted monomer. The acrylate dispersions are free from coarse-particle deposits and fine particles of coagulated material.

Preference is given to employing those dispersions having a low minimum film-forming temperature (MFT). The MFT is preferably between −30° and 40° C. and particularly preferably between −20° and 20° C. Such film-forming temperatures can be set in the polymer by an appropriate combination of monomers.

The redispersible powder binders according to the invention may be obtained by spray-drying the invention aqueous acrylate dispersions, stabilized by protective colloids, with the addition of water-soluble and/or water-dispersible resins, and mineral and other additives.

The water-soluble or water-dispersible resins are copolymers which contain at least one hydrophobic monomer which is completely or substantially completely insoluble in water. In this context, substantially insoluble in water means that the solubility of these monomers in water at 25° C. is less than 3% by weight. Furthermore, these copolymers contain at least one hydrophilic, water-soluble and salt-forming monomer. Water-soluble in this context means that the solubility of these monomers, or of their metal or ammonium salts, in water at 25° C. is at least 10% by weight.

Examples of hydrophobic monomers include linear or branched alkyl esters of acrylic and methacrylic acid, having 1 to 18 carbon atoms in the alkyl chain, vinyl esters having 1 to 12 carbon atoms in the acid component, aromatic vinyl monomers such as styrene, α-methylstyrene or vinyltoluene, and olefinically unsaturated dienes such as butadiene and isoprene. Preferred hydrophobic monomers are linear or branched alkyl esters of acrylic and methacrylic acid having 1 to 8 carbon atoms in the alkyl chain, and styrene. Particularly preferred hydrophobic monomers are methyl methacrylate, butyl acrylate and styrene.

Hydrophilic, water-soluble and salt-forming monomers which may be employed are olefinically unsaturated sulphonic and carboxylic acids and their metal and ammonium salts. Sulpho-containing derivatives of (meth)acrylic acid, such as sulphoalkyl (meth)acrylates having 1 to 8 carbon atoms in the alkyl chain are suitable for this purpose, as are aromatic vinyl-containing sulphonic acids, such as styrene sulphonic acid, vinyl sulphonic acid and (meth) allylsulphonic acid and their metal or ammonium salts. Also suitable are mono- and polybasic, olefinically unsaturated acids such as acrylic and methacrylic acid, maleic acid, fumaric acid or itaconic acid and their metal and ammonium salts. Preferred hydrophilic monomers are sulphoethyl and sulphopropyl (meth)acrylates, styrenesulphonic acid and (meth)acrylic acid and their metal and ammonium salts. Particularly preferred metal salts are the sodium and potassium salts.

The water-soluble or water-dispersible resins contain from 50 to 70% by weight of hydrophobic monomers including 50, 60 and 65% by weight and all ranges therebetween, and from 30 to 50% by weight of hydrophilic monomers including 35, 40 and 45% by weight and all ranges therebetween. As hydrophobic monomer it is possible to employ a single one of the hydrophobic monomers listed above, or else a mixture of two or more. Likewise, the hydrophilic monomer employed may be one or a mixture of the hydrophilic monomers listed.

The water-soluble or water-dispersible resins are prepared by, e.g., of free-radical solution and dispersion polymerization, which are familiar to the person skilled in the art. Polymerization is preferably carried out in water as the solvent or dispersion medium. In this context, the monomers are preferably added in a semi-continuous feed procedure. The free-radical initiator, preferably a water-soluble peroxodisulphate such as sodium peroxodisulphate or ammonium peroxodisulphate, may be provided in the initial charge or metered in semi-continuously. Preferably, no other solvents, dispersion media or emulsifiers are employed in the polymerization.

The water-soluble or water-dispersible resins have an average molecular weight of between 2,000 and 100,000 g/mol, including 5,000, 10,000, 20,000, 30,000, 40,000, 50,000, 60,000, 70,000, 80,000 and 90,000 and all ranges therebetween, preferably between 5,000 and 20,000 The desired molecular weight can be adjusted during the polymerization by adding a molecular weight regulator. For spray-drying the acrylate dispersions, the water-soluble or water-dispersible resins are added in the form of aqueous solutions or dispersions, respectively. The appropriate quantity of resin is from 0.01 to 30% by weight of solid resin per 100% by weight of component I in the dispersion. The addition of from 5 to 15% by weight, including 8, 10 and 12% by weight and all ranges therebetween, is particularly appropriate. In this context, a single resin according to the invention or a mixture of such resins may be employed.

Particularly suitable water-soluble or water-dispersible resins or resin mixtures are those whose glass transition temperature is less than 50° C. below the temperature at which the finished mixture enters the spray-drying unit. Resins or resin mixtures are particularly preferred whose glass transition temperature is less than 30° C. below the entry temperature in the spray drier.

The mixture of acrylate dispersion and water-soluble or water-dispersible resin is preferably adjusted to a solids content of from 20 to 60% by weight by the addition or removal of water. In this procedure, further additives such as antifoaming agents, dispersants, levelling assistants, thickeners or the like can be added if required. In particular further water-soluble polymers such as polyvinyl alcohols, polyethylene glycols, cellulose derivatives and starch derivatives may be added as auxiliaries, in a quantity of from 0 to 50% by weight, based on the quantity of solids of the acrylate polymer in the mixture to be spray-dried.

The redispersible powdered binders according to the invention may be prepared by spraying the mixture through one or more nozzles in to a spray-drying tower. The entry temperature of the drying gas in the spray-drying unit may vary from 80° to 150° C., preferably from 100° to 130° C. The exit temperature is from 40° to 100° C., preferably from 50° to 80° C. The mixture to be spray-dried is sprayed through single-stream nozzles, multi-stream nozzles or atomizer discs. Air, nitrogen, or mixtures of the two can be employed as drying gas.

To prevent the powder particles from sticking together during subsequent storage, the spraying through nozzles of the aqueous mixture into the spray-dryer may be accompanied—although via a separate entry device—by that of solid, powdered, mineral auxiliaries referred to below as anti-blocking agents. The content of anti-blocking agent is from 0 to 100% by weight, based on the content of acrylate polymer in the aqueous mixture to be sprayed, and preferably between 5 and 40% by weight including 10, 15, 20, 25, 30 and 35% by weight and all ranges therebetween. Examples of suitable anti-blocking agents are hydrophilic and hydrophobically modified silicic acids, calcium carbonate, talc, chalk, kaolin, calcium sulphate and similar minerals.

The redispersible powdered binders according to the present invention have an average particle diameter of from 20 to 500 μm, preferably over 100 μm including 150, 200, 250, 300, 350, 400 and 450 μm and all ranges therebetween, and are extremely low in dust content. The powders are non-blocking and stable on storage under increased load at temperatures of up to 50° C.; i.e. they separate spontaneously to give a free-flowing powder. By mechanical incorporation into water or aqueous mixtures, these powders disperse to form a dispersion having an identical or similar average particle size to the acrylate dispersion employed for their preparation.

The redispersible powdered binders according to the invention can be formulated by intimately mixing them with powdered minerals, color pigments, emulsifiers, dispersants, thickeners or other auxiliaries, to give powdered paints, coating compositions and polymer plasters. By mechanical mixing with water, these dry mixtures can be converted to ready-to-use paints and coating compositions. Likewise, the powders are suitable for the modification of hydraulically setting compositions such as concrete, mortars, building adhesives and screens.

Similarly, the aqueous acrylate dispersions on which the redispersion powders according to the invention are based, and the dispersions obtained by redispersing the dried powders, are suitable as binders for emulsion paints and coatings of mineral and metallic substrates, and as additives to hydraulically setting compositions. By using the invention powdered dry mixtures which are not formulated with water until directly before use, the storage and transportation problems associated with water as dispersion medium be avoided. The addition of preservatives is not required. Moreover, the containers used to hold the invention dry mixtures may be emptied completely without residues in a rapid and problem-free manner, so that these containers can be disposed of simply and in an environmentally compatible manner.

The invention is illustrated in more detail by the examples which follow but is not limited thereto. The viscosities given were determined using a Brookfield viscometer. The proportion of coagulated material was separated off on a screen (mesh size 45 μm); the proportion given relates to the solids content of the dispersion.

EXAMPLE 1

Preparation of an acrylate dispersion

In a polymerization vessel with stirrer, internal thermometer and metering devices, the components of mixture 1 were placed together with 800 g of water.

| Mixture 1 | Monomer Mixture |
| --- | --- |
| 5 g of tert-butyl hydroperoxide | 400 g of styrene |
| 10 g of polyvinyl alcohol | 600 g of butyl acrylate |
| 0.5 g of triethanolamine | Activator solution |
| 5 g of acrylamide | |
| 1 g of sodium EDTA | 300 g of water |
| 0.5 g of $C_{15}$-alkanesulphonate | 4 g of sodium formaldehyde sulphoxylate |
| 20 g of acrylic acid | |
| 11 g of sodium hydroxide | |

After heating the mixture to 70° C., the monomer mixture was added dropwise with stirring over the course of 5 hours and the activator solution was added dropwise over the course of 6 hours, after which polymerization was continued for 2 hours more. The resulting dispersion had a solids content of 50.2% by weight, a viscosity of 1300 mPa.s and a content of coagulated material of 0.04%. The average particle size was 206 nm.

Examples 2 to 4 below illustrate the preparation of the water-soluble or water-dispersible resins employed for the preparation of the dispersion powders according to the invention.

EXAMPLE 2

In a polymerization vessel with stirrer, internal thermometer and metering devices, 160 g of water was placed as an initial charge and heated to 75° C. 48 g of sodium styrene sulphonate in 400 g of water was metered in continuously over the course of 2 hours at the same time as 112 g of methyl methacrylate. 1.6 g of sodium peroxodisulphate in 80 g of water was metered in over the course of 3 hours. Polymerization was then continued for 2 hours more. A clear solution is obtained, having a solids content of 20.5% by weight.

EXAMPLE 3

The reaction is carried out analogously to Example 2, but 80 g of sodium styrene sulphonate and 80 g of styrene were employed as monomers. A dispersion is obtained having a solids content of 19.9% by weight.

EXAMPLE 4

In a polymerization vessel with stirrer, internal thermometer and metering devices, 300 g of methyl ethyl ketone were placed as an initial charge and heated to 75° C. 120 g of acrylic acid and 280 g of methyl methacrylate were metered in continuously over the course of 2 hours. 12 g of azobisisobutyronitrile in 100 g of methyl ethyl ketone were metered in over the course of 3 hours. Polymerization was then continued for 4 hours more. 67 g of sodium hydroxide in an excess of water were added, and the methyl ethyl ketone is completely removed by distillation. A clear solution was obtained, having a solids content of 18.2% by weight.

The example which follows illustrates the preparation of the dispersible powdered dispersion according to the invention as obtained by spray-drying.

EXAMPLE 5

4,000 g of the dispersion of Example 1 were mixed homogeneously with 1,103 g of an aqueous solution of the copolymer of Example 4 (corresponding to 10% by weight of copolymer per 100% by weight of latex solids) and diluted with water to a solids content of 40% by weight.

This mixture was sprayed through a two-stream nozzle in a commercial experimental spray dryer from NIRO, in countercurrent flow at an entry temperature of 110° C. The drying gas used was nitrogen at a flow rate of about 500 m³/h. A mixture of equal parts by weight of talc and dolomite was sprayed in through a second nozzle in countercurrent flow. The throughputs of product and mineral are regulated such that a temperature of 70° C. and a mineral content of from 20% by weight per 100% by weight of solids in the aqueous mixture were achieved in the tower exit. The product obtained was deposited via a cyclone.

The resulting powder was free flowing and did not stick even when exposed to increased load and temperature. Using water, the powder can be made up again, by stirring, to give a stable dispersion.

This application is based on German application P 44 07 841.2 filed Mar. 9, 1994, incorporated herein by reference.

Clearly, various modifications of the present invention are possible which fall within the scope hereof.

What is claimed as new and desired to be secured by Letters Patent of the United States is:

1. A redispersible powdered binder, comprising:
   (I) an aqueous acrylate dispersion stabilized with a protective colloid having a solids content of 10 to 65 wt. %; and
   (II) 0.01 to 30 wt. %, based on 100 wt. % of component (I) of a water-soluble or water-dispersible resin having a mean molecular weight ranging from 2000 to 100,000 g/mol, consisting of
      (a) 50 to 70 wt. % of at least one hydrophobic monomer, essentially insoluble in water by having a solubility in water of less than 3 wt. % at 25° C., and
      (b) 50 to 30 wt. % of at least one hydrophilic monomer, which is soluble in water and which forms salts, where the solubility of these monomers in metal or ammonium salt form in water is at least 10 wt. % at 25° C.;

prepared by spray-drying the combination of components (I) and (II) in a hot air stream to form the powdered binder with the formation of little dust.

2. The redispersible powdered binder of claim 1, wherein said component (IIa) is a hydrophobic monomer selected from the group consisting of a $C_{1-8}$-alkyl(meth)acrylate, styrene, and mixtures thereof; and component (IIb) is a water-soluble, hydrophilic-unsaturated sulfonic acid compound or salt thereof, an unsaturated monobasic or multibasic carboxylic acid or salt thereof, or a combination of said unsaturated sulfonic acid compound and said unsaturated carboxylic acid compound.

3. The redispersible powdered binder of claim 1, wherein the water-soluble or water-dispersible resin has a glass transition temperature less than 50° C. below the point of entry of the combined ingredients to the spray-dryer in which the materials are spray-dried.

4. The redispersible powdered binder of claim 2, wherein the water-soluble or water-dispersible resin has a glass transition temperature less than 50° C. below the point of entry of the combined ingredients to the spray-dryer in which the materials are spray-dried.

5. The redispersible powdered binder of claim 1, wherein the aqueous acrylate dispersion (I) has a minimum film formation temperature of −30° C. to 40° C.

6. The redispersible powdered binder of claim 2, wherein the aqueous acrylate dispersion (I) has a minimum film formation temperature of −30° C. to 40° C.

7. The redispersible powdered binder of claim 1, wherein the water-soluble polymer which forms said protective colloid is hydroxyethyl cellulose, hydroxypropyl cellulose, carboxymethyl cellulose, water-soluble and water-swellable starches and dextrins, polyethylene glycols, polyethylene-polypropylene diblock and triblock copolymers and naturally occurring proteins.

8. The redispersible powdered binder of claim 1, wherein the acrylate monomer component of said acrylate dispersion comprises from 20 to 100% of $C_{1-18}$-alkyl(meth)acrylate, and the remaining monomer of the acrylate dispersion is a member selected from the group consisting of aromatic vinyl monomers, vinyl esters having 1 to 12 carbon atoms in the acid component, olefinically unsaturated dienes and halogenated olefinically unsaturated monomers.

9. A method for the preparation of a redispersible powdered binder, comprising:
   spray-drying a mixture of an aqueous acrylate dispersion and from 0.01 to 30 wt. %, based on 100 wt. % of said aqueous acrylate dispersion, of a water-soluble or water-dispersible resin in a spray-dryer having an entry temperature of 80° to 150° C. and an exit temperature of 40° to 100° C., thereby forming said powdered, free-flowing binder having little dust, said aqueous acrylate dispersion (I) being stabilized with a protective colloid having a solids content of 10 to 65 wt. %; and said water-soluble or water-dispersible resin (II) having a mean molecular weight ranging from 2000 to 100,000 g/mol, consisting of
(a) 50 to 70 wt. % of at least one hydrophobic monomer essentially insoluble in water having a solubility in water of less than 3 wt. % at 25° C., and
(b) 50 to 30 wt. % of at least one hydrophilic monomer, which is soluble in water and which forms salts, the metal or ammonium salt form of the monomer having a solubility of at least 10 wt. % at 25° C. in water.

10. A paint or coating composition comprising the redispersible powdered binder of claim 1 and no hydraulic binder.

11. A paint or coating composition comprising the redispersible powdered binder of claim 2 and no hydraulic binder.

12. A hydraulically setting composition comprising the redispersible powdered binder of claim 1 and no hydraulic binder.

13. A hydraulically setting composition comprising the redispersible powdered binder of claim 2 and no hydraulic binder.

* * * * *